United States Patent
Hosokawa et al.

(10) Patent No.: US 9,381,993 B2
(45) Date of Patent: Jul. 5, 2016

(54) AIRFRAME PANEL FOR AIRCRAFT AND AIRCRAFT WING

(71) Applicant: MITSUBISHI AIRCRAFT CORPORATION, Aichi (JP)

(72) Inventors: Yoshifumi Hosokawa, Aichi (JP); Hideto Motohashi, Aichi (JP); Kouhei Murakami, Aichi (JP); Toshinari Fujii, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 4 days.

(21) Appl. No.: 14/161,047

(22) Filed: Jan. 22, 2014

(65) Prior Publication Data
US 2014/0209745 A1     Jul. 31, 2014

(30) Foreign Application Priority Data

Jan. 25, 2013  (JP) .................................. 2013-11748

(51) Int. Cl.
| | |
|---|---|
| *B64C 1/00* | (2006.01) |
| *B64C 3/26* | (2006.01) |
| *B64C 3/18* | (2006.01) |

(52) U.S. Cl.
CPC . *B64C 3/26* (2013.01); *B64C 3/182* (2013.01); *B64C 3/187* (2013.01)

(58) Field of Classification Search
None
See application file for complete search history.

(56) References Cited

U.S. PATENT DOCUMENTS

| | | | | |
|---|---|---|---|---|
| 2,233,969 | A * | 3/1941 | Woods ....................... | 244/123.8 |
| 5,348,601 | A * | 9/1994 | Ray .............................. | 156/155 |
| 6,170,157 | B1 * | 1/2001 | Munk et al. .................. | 29/897.2 |
| 6,510,961 | B1 * | 1/2003 | Head et al. ..................... | 220/645 |
| 7,641,147 | B2 * | 1/2010 | Schmidt et al. ............. | 244/123.1 |
| 7,861,969 | B2 * | 1/2011 | Guzman et al. ............... | 244/120 |
| 2005/0003145 | A1 * | 1/2005 | Toi et al. ........................ | 428/102 |
| 2005/0263645 | A1 * | 12/2005 | Johnson et al. ............... | 244/119 |
| 2006/0226287 | A1 * | 10/2006 | Grantham et al. ............ | 244/119 |
| 2008/0111024 | A1 * | 5/2008 | Lee et al. ....................... | 244/121 |
| 2008/0128552 | A1 * | 6/2008 | Namaizawa et al. ....... | 244/123.1 |
| 2008/0265094 | A1 * | 10/2008 | Van Der Veen et al. ... | 244/123.1 |
| 2009/0206203 | A1 * | 8/2009 | Crawford ................... | 244/123.7 |
| 2009/0283638 | A1 * | 11/2009 | Arevalo Rodriguez et al. ............................. | 244/119 |
| 2010/0181427 | A1 * | 7/2010 | Makela .................... | 244/123.12 |
| 2010/0258676 | A1 * | 10/2010 | Gauthie et al. ................ | 244/131 |
| 2010/0272954 | A1 * | 10/2010 | Roming et al. ............... | 428/138 |
| 2011/0027526 | A1 * | 2/2011 | McCarville et al. .......... | 428/116 |
| 2011/0139932 | A1 * | 6/2011 | Matheson et al. ............ | 244/132 |
| 2012/0187246 | A1 * | 7/2012 | Motohashi et al. ........ | 244/123.1 |
| 2012/0211603 | A1 * | 8/2012 | Motohashi et al. ........ | 244/123.1 |

(Continued)

FOREIGN PATENT DOCUMENTS

| | | |
|---|---|---|
| JP | 2011-051517 A | 3/2011 |
| JP | 2012-171453 A | 9/2012 |

*Primary Examiner* — Medhat Badawi
(74) *Attorney, Agent, or Firm* — Pearne & Gordon LLP (57) ABSTRACT

An airframe panel for aircraft having stringers and ribs which enables reduction of the workload of the shimming operation includes a plurality of stringers provided on the inner surface of a lower skin along the spanwise direction of a wing, and a plurality of ribs provided along the chordwise direction of the wing. In a part of the panel in which a rib is provided, a flat support surface connects the two adjacent stringers. In another part of the panel in which no rib is provided, a stepped surface connects the two adjacent stringers where the stepped surface includes a thin-walled groove, and thick-walled bases to be connected to the stringers located at both sides of the groove.

5 Claims, 7 Drawing Sheets

(56) References Cited

U.S. PATENT DOCUMENTS

| | | | |
|---|---|---|---|
| 2013/0216766 A1* | 8/2013 | Tanaka et al. | 428/99 |
| 2013/0319750 A1* | 12/2013 | Waku | 174/264 |
| 2013/0320142 A1* | 12/2013 | Nordman | 244/123.5 |
| 2014/0209745 A1* | 7/2014 | Hosokawa et al. | 244/123.1 |

\* cited by examiner

AIRFRAME PANEL FOR AIRCRAFT AND AIRCRAFT WING

BACKGROUND OF THE INVENTION

1. Field of the Invention

The present invention relates to an airframe panel for aircraft used primarily for an aircraft wing.

2. Description of the Related Art

An aircraft main wing is formed by attaching an aircraft wing panel forming the outer surface of the main wing to a frame member forming a skeleton. The aircraft wing panel is curvedly formed into a three-dimensional shape. Specifically, in an airframe, for example, one in which an engine is attached to the lower part of the main wing, the aircraft wing panel forming the upper surface of the main wing is curvedly formed so that the outer surface side of the main wing is convex in the spanwise direction of the wing, and the aircraft wing panel forming the lower surface of the main wing is curvedly formed so that the outer surface side of main wing is concave in the spanwise direction of the wing (convex upwardly).

Figure 7:
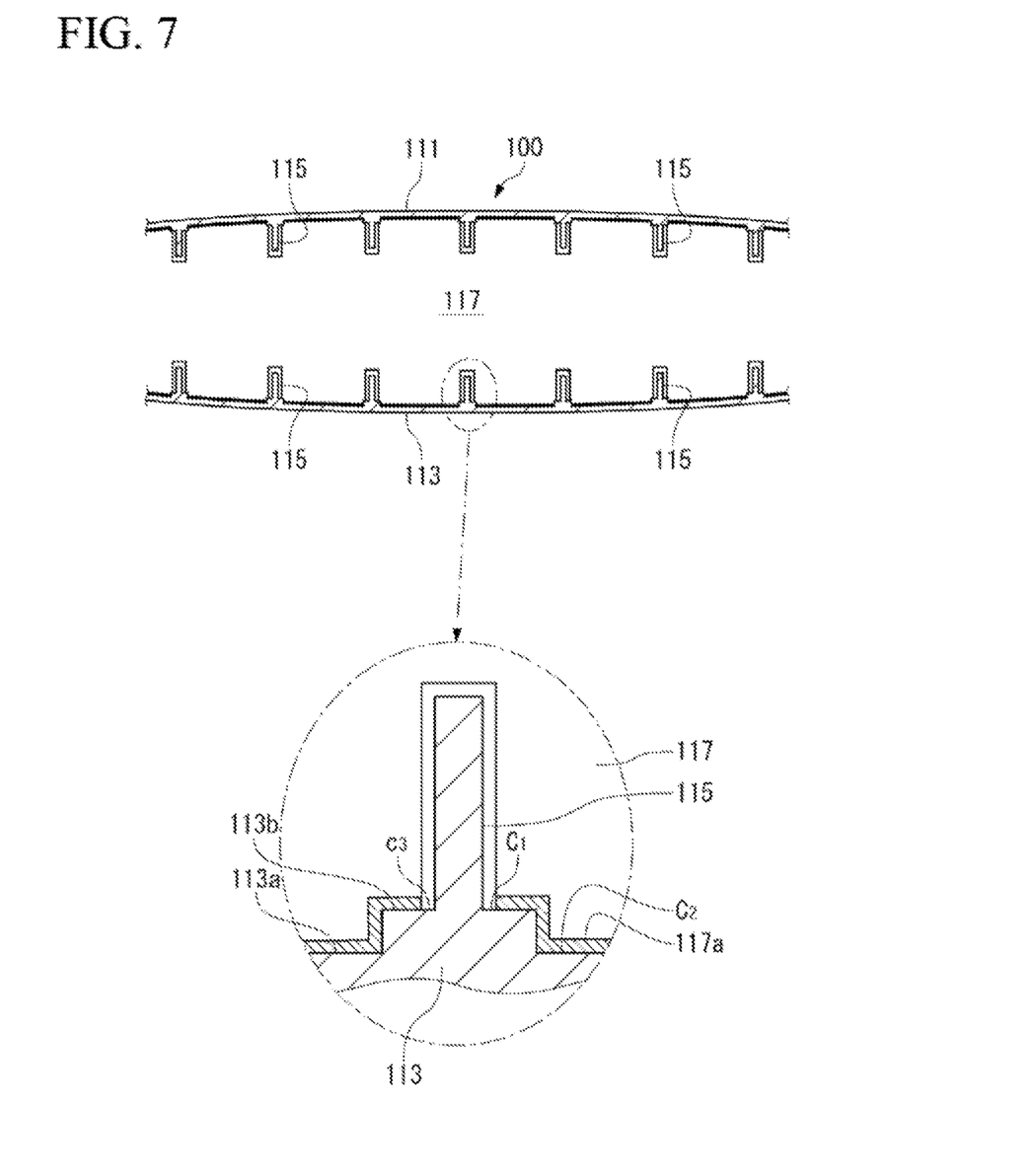
FIG. 7 is a diagram showing a cross-section of a conventional aircraft main wing.

The main wing constituted by such aircraft wing panels includes stringers and ribs to secure the strength (see Japanese Patent Laid-Open No. 2011-51517 and Japanese Patent Laid-Open No. 2012-171453). The stringers are provided on the inner surface of the main wing along the spanwise direction of the wing, and the ribs are provided along the chordwise direction of the main wing. An example of the configuration is shown in FIG. 7. In this example, a plurality of stringers 115 are formed on the inner surfaces of an upper skin 111 and a lower skin 113 to extend in the spanwise direction (the direction perpendicular to the drawing of FIG. 7) of a main wing 100 between a front and a rear (in the horizontal direction in the drawing of FIG. 7) of the main wing 100. The stringers 115, along with front and rear spars (not shown), transmit forces such as bending and torsional forces which act on the main wing 100 in the longitudinal direction, the spanwise direction, and vertical direction, to an aircraft fuselage to which the main wing 100 is attached. On the other hand, ribs 117 extend in the chordwise direction of the main wing 100, and are provided across the upper skin 111 and the lower skin 113.

The lower skin 113 generally includes thick-walled portions 113b along the roots of the stringers 115 to secure the required rigidity and the like, and thin-walled portions 113a as the remainder thereof in order to reduce the weight of the main wing. The rib 117 includes steps at its edge 117a, which is to be attached to the lower skin 113, so as to conform to the thin-walled portions 113a and thick-walled portions 113b of the lower skin 113.

SUMMARY OF THE INVENTION

When the rib 117 is fixed to the lower skin 113, the lower skin 113 includes a thin-walled portion 113a and thick-walled portions 113b at both sides of the thin-walled portion 113a. Thus, as described in detail later, the lower skin 113 can have three contact surfaces capable of contacting the rib 117, that is, contact surfaces c1 and c3 on both thick-walled portions 113b at both sides and a contact surface c2 on the thin-walled portion 113a. However, in practice, only one of these contact surfaces of the lower skin 113 comes in contact with the rib 117 due to the manufacturing tolerances of the lower skin 113 and the rib 117. Accordingly, when relatively large gaps occur at the other contact surfaces where they are not in contact with the rib, shims must be inserted into the gaps (hereinafter called shimming operation). As a main wing of an aircraft includes many stringers and ribs, the shimming operation will become a very high workload task.

The present invention is accomplished in view of such a technical problem, and has an object to provide an airframe panel for aircraft which enables reduction of the workload of the shimming operation. Another object of the present invention is to provide an aircraft wing constituted by such airframe panels for aircraft.

The present invention with such the object provides an airframe panel for constituting an aircraft, including: a skin; and a plurality of stringers provided on the skin along a first direction; wherein the skin includes a first region in which a rib is provided along a second direction that intersects the first direction, and a second region in which the rib is not provided, and wherein a flat surface connects the two adjacent stringers in the first region, while a stepped surface connects the two adjacent stringers in the second region.

In the airframe panel for aircraft of the present invention, the flat surface extends in the first region in which the rib is provided. Thus, as the rib comes into contact only with the flat surface, the shimming operation can be eliminated even when manufacturing tolerances are taken into account.

In the airframe panel for aircraft of the present invention, the second region in which the rib is not provided includes thick-walled portions to be connected to the stringers, and a thin-walled portion between the thick-walled portions. Thus, the airframe panel for aircraft can have a reduced weight while securing the required rigidity for the stringers.

The airframe panel for aircraft of the present invention is typically used in an aircraft wing.

The stepped surface may be constituted by the thin-walled portion located at the center of the two adjacent stringers, and the thick-walled portions located at both sides of the thin-walled portion along the roots of the stringers.

The stringers and the skin may comprise a single, unitary piece of a base material.

In the airframe panel for aircraft of the present invention, a portion where the flat surface connects the two adjacent stringers in the first region may have the same thickness as the thick-walled portions of the stepped surface in the second region.

In this case, preparation of the panel by machining only requires two steps, that is, processing a material, for example, by cutting so as to have the thickness of the thick-walled portion, and then processing the material by cutting to form the thin-walled portion.

According to the present invention, as a flat surface extends in the first region in which a rib is provided in an airframe panel for aircraft, the shimming operation can be eliminated. Also, according to the present invention, as the second region in which a rib is not provided includes thick-walled portions to be connected to stringers, and a thin-walled portion is provided between the thick-walled portions, the airframe panel for aircraft can have a reduced weight while securing the required rigidity for the stringers.

BRIEF DESCRIPTION OF THE DRAWINGS

FIGS. 1A to 1C are partial cross sectional views of an aircraft wing panel of the present embodiment.

DETAILED DESCRIPTION OF THE PREFERRED EMBODIMENTS

Hereinafter, the present invention is described in accordance with an embodiment as illustrated in the accompanying drawings.

Figure 1A:
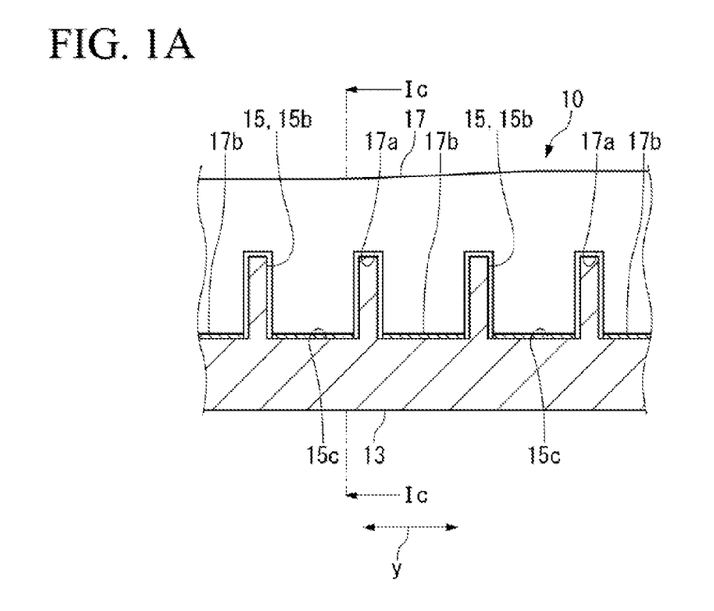
FIG. 1A is a cross section taken along line Ia-Ia as viewed from arrow in FIG. 2.
Figure 1B:
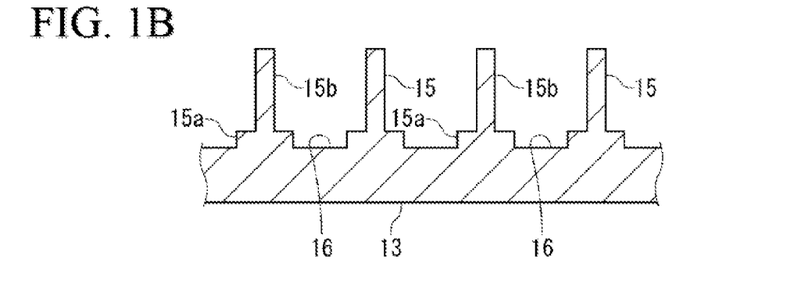
FIG. 1B is a cross section taken along line Ib-Ib as viewed from arrow in FIG. 2.
Figure 1C:
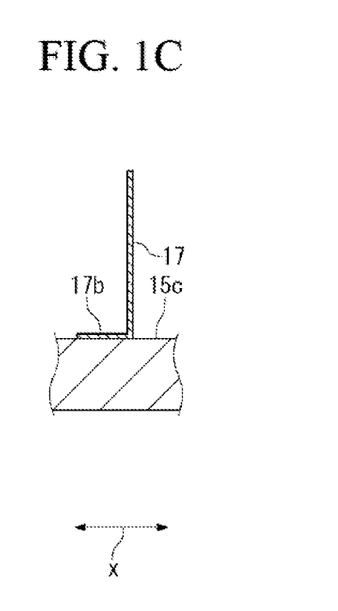
FIG. 1C is a cross section taken along line Ic-Ic as viewed from arrow in FIG. 1A.
Figure 2:
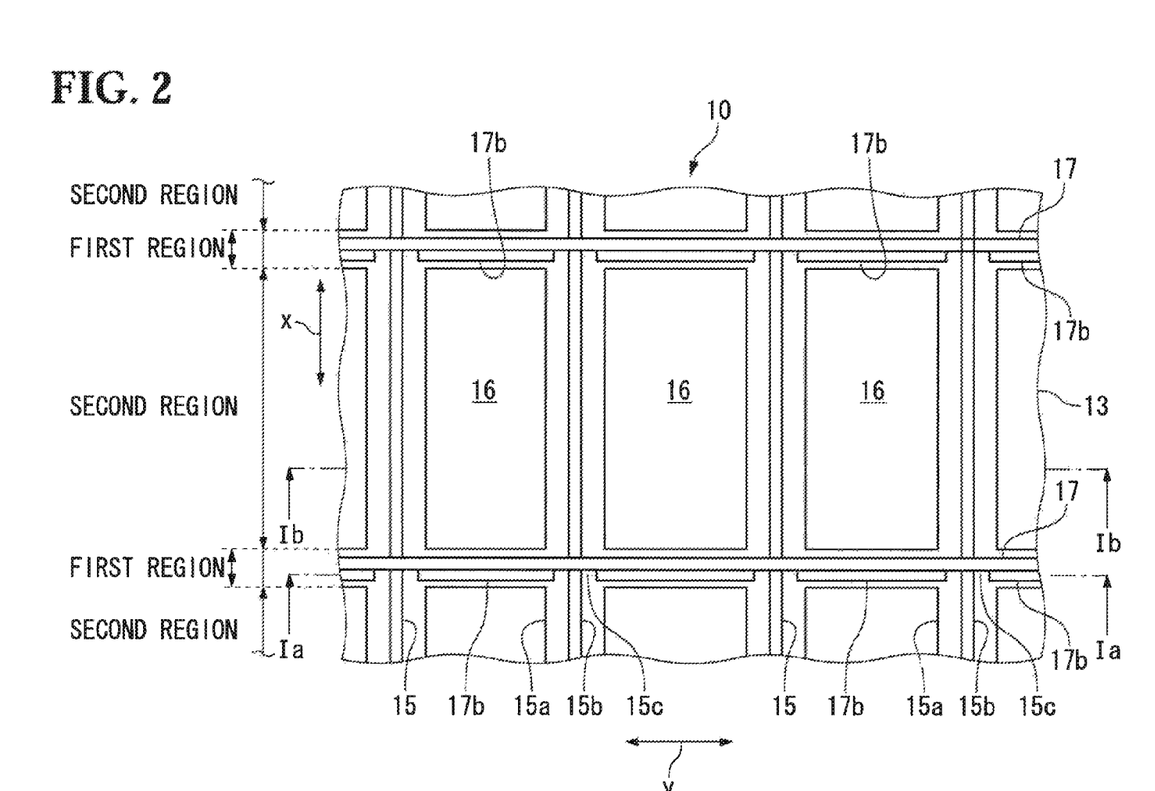
FIG. 2 is a partial plan view of the aircraft wing panel of the present embodiment.

An aircraft wing panel 10 shown in FIGS. 1 and 2 constitutes a main wing 1 (FIG. 6) of an aircraft.

The main wing 1 includes an upper skin 11 forming an upper surface of the wing, and a lower skin 13 forming a lower surface of the wing. The upper skin 11 and the lower skin 13 are each provided with a plurality of stringers 15 extending on the inner surface along the spanwise direction (first direction) x of the main wing 1. The main wing 1 also includes ribs 17 extending along the chordwise direction (second direction) y between the upper skin 11 and the lower skin 13. The aircraft wing panel 10 is configured to include a skin (the upper skin 11 or lower skin 13) and stringers 15.

The stringers 15 transmit forces such as bending and torsional forces which act on the main wing 1 in the longitudinal direction, the spanwise direction, and vertical direction, to an aircraft fuselage to which the main wing 1 is attached. The stringers 15 may be integrally formed with the upper skin 11 or the lower skin 13. Alternatively, the stringers 15 may be independently formed and joined to the upper skin 11 or the lower skin 13 at their prescribed locations. Described below is an embodiment in which the stringers 15 are integrally formed with the lower skin 13. Note that the stringers 15 integrally formed with the upper skin 11 or the lower skin 13 can be machined out of a skin material (base material).

Figure 6:
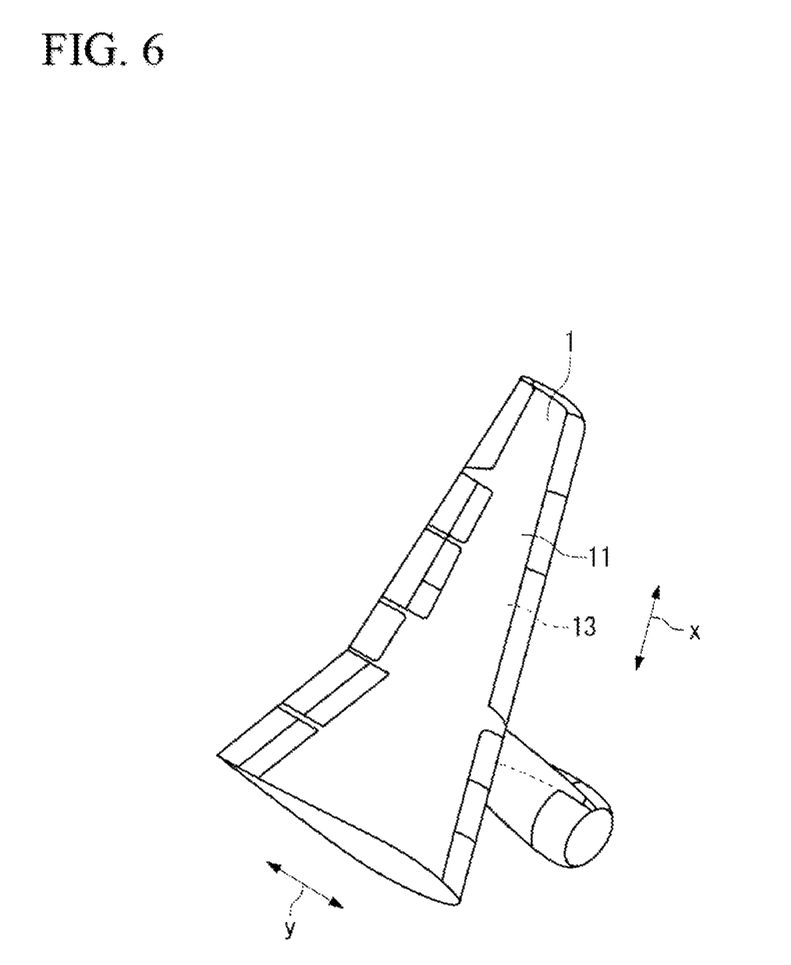
FIG. 6 is a diagram showing an aircraft main wing to which the present invention is applied.

As shown in FIG. 1B and FIG. 2, the stringers 15 have an I cross-section, and their roots are integrally formed with the inner surface of the lower skin 13. Each stringer 15 is comprised of a base 15a connected to the lower skin 13 and a web 15b upward-standing from the base 15a. The base 15a has a width wider than that of the web 15b, and is provided to secure the rigidity of the lower skin 13 required to withstand forces primarily in the spanwise direction. The plurality of stringers 15 are arranged side by side and separated from each other at a prescribed distance in the chordwise direction y such that a portion between the bases 15a and 15a of the adjacent stringers 15 is recessed from the upper surface of the base 15a so as to form a groove 16 extending in the spanwise direction x (FIG. 6). Thus, a thin-walled portion is located at the center portion between the adjacent stringers 15, and a thick-walled portions are located at both sides of the thin-walled portion along the roots of the stringers 15. However, as shown in FIG. 2, the grooves 16 are filled in at predetermined intervals to form, along with the adjacent bases 15a and 15a, a flat support surface 15c (FIG. 1A).

Here, though the expression "grooves 16 are filled in" is used for ease of understanding, the flat support surface 15c can be formed in at least two ways. The first one is to form a groove 16 over the whole area between the bases 15a and 15a of the stringers 15 which area includes the support surface 15c, followed by inserting and fixing a separately-prepared member into a region which forms the flat support surface 15c. In this case, the groove is literally filled in. The second one is to form the grooves 16 by machining in the regions other than where the support surfaces 15c are to be formed. In the present embodiment, the support surface may be formed in either way. However, the second method is preferable to accurately form the support surfaces 15c.

The ribs 17 are provided between the upper skin 11 and the lower skin 13 to secure the rigidity of both of the upper skin 11 and the lower skin 13.

As shown in FIGS. 1A and 1C, the ribs 17 are a plate-like member having a peripheral edge formed into the shape in conformity with the lower skin 13 it faces, taking regions corresponding to the above-described stringers 15 into consideration. Each rib 17 defines cutouts 17a so as to conform to the respective stringers 15. The stringers 15 extend through the cutouts 17a. The rib 17 has a straight edge between the adjacent cutouts 17a, 17a. The rib 17 defines flanges 17b at the side to be connected to the lower skin 13. The rib 17 is fixed to the support surface 15c of the stringer 15 by passing fasteners (not shown) through the flanges 17b from above and fastening them.

The rib 17 is disposed so as to come into contact with the flat support surface 15c. Thus, as shown in FIG. 1A, when the rib 17 is disposed onto the lower skin 13, the rib 17 will come into contact only with a single surface between the adjacent stringers 15, that is, the support surface 15c. This is the essential feature of the present embodiment of the present invention.

The rib 17 is prepared by machining, or metal working which involves bending a sheet metal. The rib 17 is in a flat shape in this embodiment, but not limited thereto. The rib 17 may be formed with a curved shape in a plan view of the main wing 1.

The effects of the aircraft wing panel 10 with the above configuration are described below.

Figure 3A:
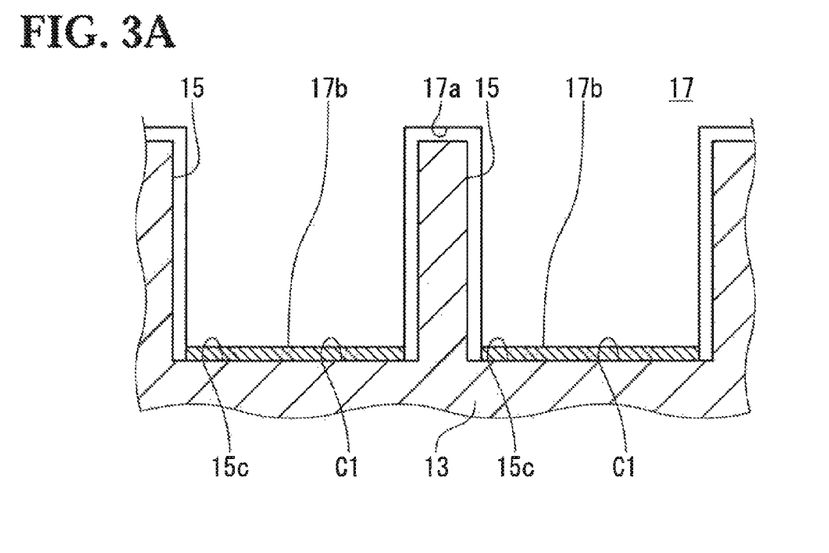
FIG. 3A is a partial enlarged view of FIG. 1A.

In the present embodiment, when attaching the rib 17 to the lower skin 13 provided with the stringers 15, the cutouts 17a of the rib 17 is positioned in alignment with the stringers 15, and then the flange 17b of the rib 17 abuts against the inner surface of the lower skin 13 as shown in FIG. 3A. As the region (first region) against which the flange 17b abuts is the flat support surface 15c, the flange 17b comes into contact only with a single contact surface C1 of the support surface 15c.

Figure 3B:
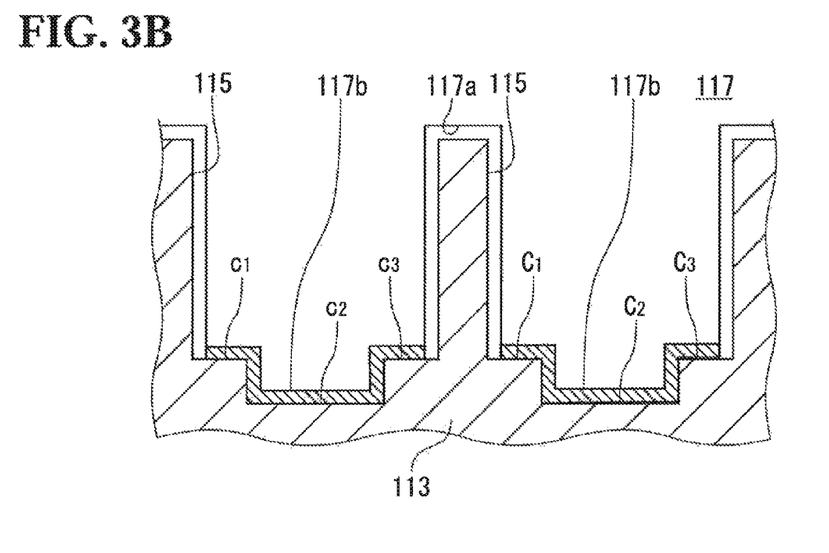
FIG. 3B is a partial enlarged view of a conventional aircraft wing panel.

On the other hand, as shown in FIG. 3B, an aircraft wing panel having a conventional structure includes a stepped surface in the region (second region) which connects adjacent stringers 115, 115 in the lower skin 113, while a rib 117 includes a stepped part on the edge facing the lower skin 113 accordingly. Thus, a flange 117b of the rib 117 comes into contact with three contact surfaces $c_1$, $c_2$, and $c_3$ of the lower skin 113.

In the case of the aircraft wing panel of the present embodiment, only a single contact surface C1 is used. Thus, even if the support surface 15c of the lower skin 13 is in partial contact with the flange 17b of the rib 17, a small gap is created between the two. Specifically, in FIG. 3A, if the support surface 15c and the flange 17b have contact with each other at one end, but do not have at the other end, a gap is created in the part where they do not have contact. However, as the resulting gap is likely to fall within their tolerance ranges, there is no need to insert shims into the gap according to the present embodiment.

In contrast, in the case of the aircraft wing panel having a conventional structure, three contact surfaces $c_1$, $c_2$, and $c_3$ are used. Thus, a gap is likely to easily occur, and become larger compared with the present embodiment. Specifically, in FIG. 3B, it is assumed that a contact occurs at the left contact surface $c_1$, but a contact does not occur at the center and right contact surfaces $c_2$ and $c_3$ to create a gap. In this case, as the contact surfaces $c_1$, $c_2$, and $c_3$ have respective tolerances $t_1$, $t_2$, and $t_3$, the contact surfaces $c_2$ and $c_3$ have the accumulated tolerances $t_1+t_2$ and the accumulated tolerances $t_1+t_2+t_3$, respectively, both with regard to the contact surface $c_1$ where a contact occurs, resulting in that the gaps occurring at the contact surfaces $c_2$ and $c_3$ become larger. Thus, shimming operation will become necessary in the part of the contact surfaces $c_2$ and $c_3$.

According to the present embodiment, the following advantageous effects are achieved in addition to the elimination of shimming operation.

(1) The width L of flanges 17b of the rib 17 can be minimized.

As described earlier, the rib 17 is fixed to the lower skin 13 by the fasteners. In order to tighten each fastener, the rib 17 and the lower skin 13 need to have a required thickness in the radial direction of the fastener at the periphery of the fastener.

Figure 4A:
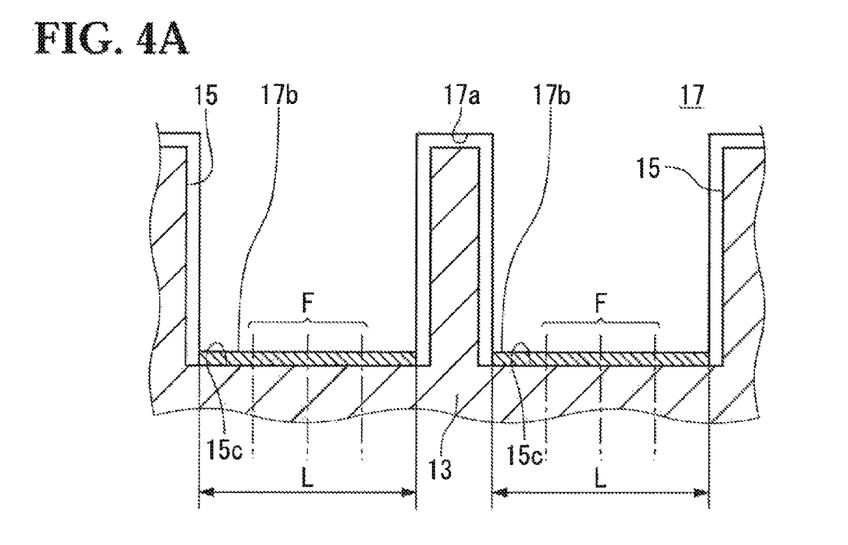
FIG. 4A is a partial enlarged view of FIG. 1A.
Figure 4B:
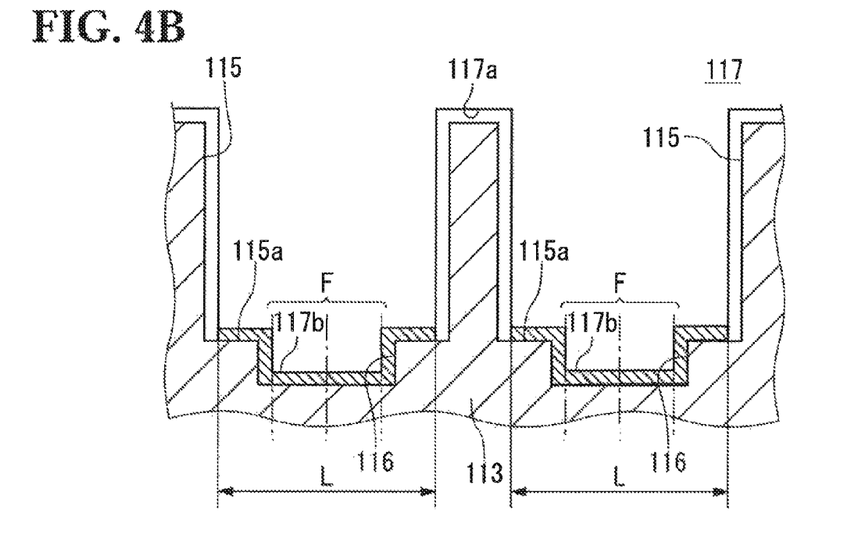
FIG. 4B is a partial enlarged view of a conventional aircraft wing panel.

However, as shown in FIG. 4B, in the case of the aircraft wing panel of a conventional structure having steps, it is not possible to secure the required thickness around the boundaries between the base 115a and the groove 116. Thus, when three fasteners F are provided and tightened between the adjacent stringers 115 at predetermined intervals, the fasteners are necessary to be provided away from the boundaries. Therefore, the flanges 117b of the rib 117 need to be configured to have a large width L accordingly.

In contrast, as shown in FIG. 4A, when the support surface 15c without steps is provided between the adjacent stringers 15, as it is not necessary to provide fasteners away from the boundaries, three fasteners F can be provided and tightened at predetermined intervals.

Therefore, according to the present embodiment, the distance between the adjacent stringers 15 can be determined without considering positions where fasteners are provided and tightened, thereby securing flexibility in designing the aircraft wing panel 10.

(2) The fasteners F can be configured to have a unified length.

As shown in FIG. 4A, as the aircraft wing panel of the present invention has no steps between the adjacent stringers 15 to form a flat part, the lower skin 13 has a constant thickness between the stringers. Thus, fasteners to be tightened in this part can have a constant length.

In contrast, as shown in FIG. 4B, the aircraft wing panel having a conventional structure has steps between the adjacent stringers 15, resulting in that the lower skin 113 with the groove 116 has a different thickness from the base 115a. It follows that fasteners F to be tightened to the thin lower skin 113 must have a different length from those to be tightened to the base 115a.

As described above, according to the present embodiment, the ribs 17 can be fixed with fasteners F with a unified length, the fixing works can be standardized compared with those with different lengths of fasteners F.

(3) The ribs 17 can be easily machined.

As shown in FIG. 4A, the rib 17 of the present embodiment defines flanges 17b having a straight edge in the width direction, which is attached to the lower skin 13, and which can be easily machined compared with the stepped flanges 117b shown in FIG. 4B. Particularly, in the case where the rib 17 is manufactured of a sheet metal, the machinability is significantly improved.

While the embodiments of the present invention have been described above, various changes in design can be made within the spirit of the present invention.

Figure 5A:
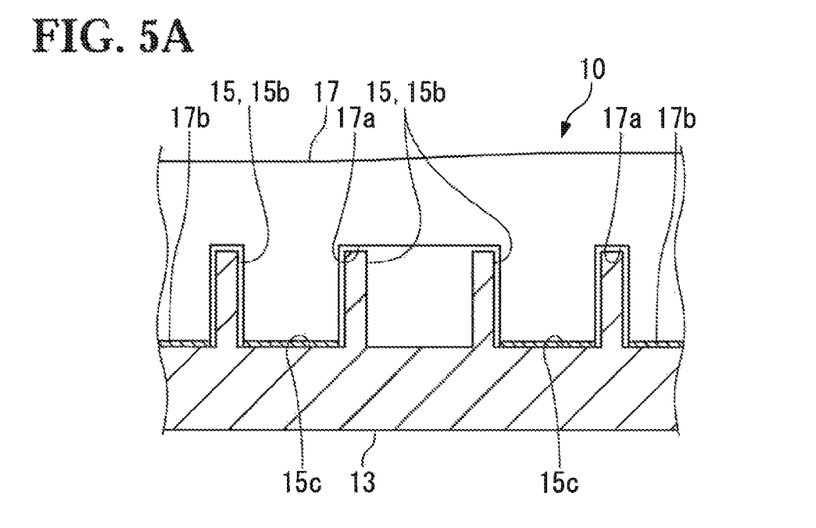
FIGS. 5A to 5C show variations of the present embodiment.

For example, as shown in FIG. 5A, a plurality of (two) stringers 15 may be accommodated in a single cutout 17a of the rib 17. This feature is provided, for example, for cases where other devices and/or members need to be disposed between the two adjacent stringers 15.

Figure 5B:
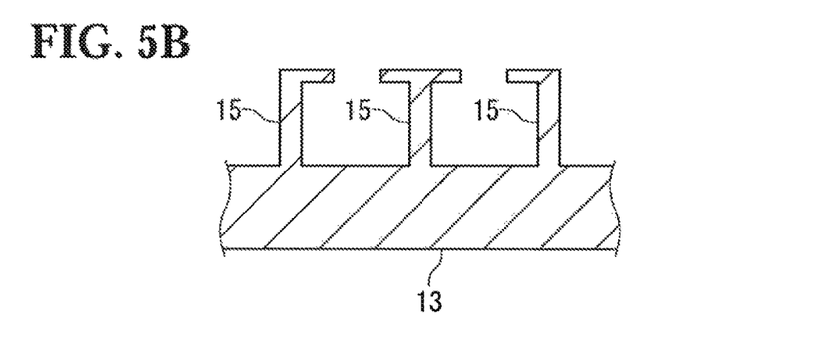

In the above embodiment, an example is shown in which the web 15b of stringer 15 has an I cross-section (a liner shape). However, as shown in FIG. 5B, various forms of stringers may also be used in the present invention.

In the present embodiment, the lower skin 13 has a constant thickness in the spanwise direction x in respective regions constituting the support surface 15c, the base 15a, and the groove 16. However, the thickness may vary depending on the required rigidity.

Figure 5C:
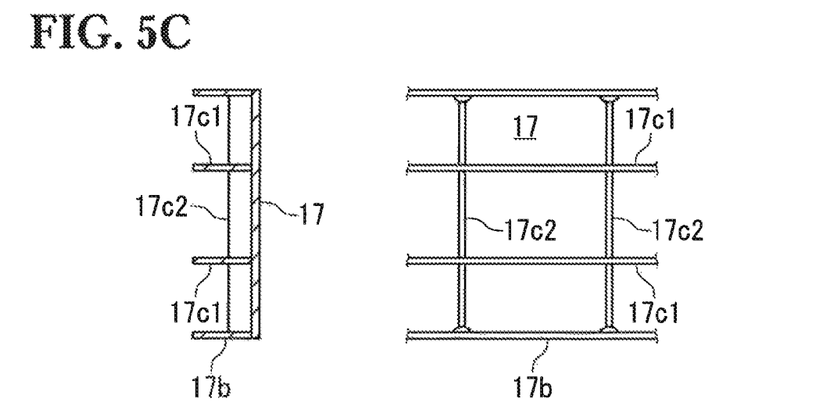

Also, in the above embodiment, an example is shown in which the rib 17 is in a flat shape except for the flange 17b. However, as shown in FIG. 5C, reinforcing ribs 17c1 along the width direction of the rib 17 or reinforcing ribs 17c2 along the height direction of the rib 17 may be provided to increase the rigidity.

Although, in the above-described embodiments, an example is shown in which the present invention is applied to a main wing of an aircraft, a structure of the present invention can be applied to an aircraft fuselage.

Other than these, the configurations cited in the above described embodiments can be selected or omitted, or can be arbitrarily changed to the other configurations, without departing from the gist of the present invention.

What is claimed is:

1. An airframe panel for aircraft comprising:
   a skin having an inner surface; and
   a plurality of stringers provided on the skin along a first direction, the plurality of stringers each comprising a base portion extending from the inner surface of the skin and a web portion extending from the base portion, the base portion being wider than the web portion;
   wherein the skin includes a first region in which a rib is provided along a second direction that intersects the first direction, and a second region in which the rib is not provided,
   wherein the skin comprises a raised surface portion integral with and extending from the inner surface, the raised surface portion having a raised support surface that is flat and is integral with and connects the base portion of two adjacent stringers of the plurality of stringers in the first region,
   wherein a stepped surface connects the two adjacent stringers in the second region,
   wherein the rib contacts the raised support surface of the skin,
   wherein a region of the skin having the raised support surface and the base portion of two adjacent stringers has a constant thickness along the second direction,
   wherein the plurality of stringers and the skin comprise a single, unitary piece of a base material, and
   wherein the plurality of stringers are integrally formed with the skin by machining out of the base material.

2. The airframe panel for aircraft according to claim 1, wherein the stepped surface includes:
a thin-walled portion located at a center of the two adjacent stringers, and thick-walled portions located at both sides of the thin-walled portion along roots of the two adjacent stringers.

3. The airframe panel for aircraft according to claim 2, wherein a portion where the flat surface of the skin connects the two adjacent stringers in the first region has a same thickness as the thick-walled portions of the stepped surface in the second region.

4. An aircraft wing comprising:
a plurality of stringers provided on an upper skin and a lower skin, respectively, to extend along a spanwise direction;
a plurality of ribs provided between the upper skin and the lower skin to extend along a chordwise direction;
wherein the aircraft includes the airframe panel for aircraft according to claim 1.

5. A method for forming an airframe panel for aircraft, the airframe panel comprising:
a skin having an inner surface; and
a plurality of stringers provided on the skin along a first direction, the plurality of stringers each comprising a base portion extending from the inner surface of the skin and a web portion extending from the base portion, the base portion being wider than the web portion;
wherein the skin includes a first region in which a rib is provided along a second direction that intersects the first direction, and a second region in which the rib is not provided,
wherein the skin comprises a raised surface portion integral with and extending from the inner surface, the raised surface portion having a flat support surface that is integral with and connects the base portion of two adjacent stringers of the plurality of stringers in the first region,
wherein a stepped surface connects the two adjacent stringers in the second region,
wherein the rib contacts the flat support surface of the skin,
wherein a region of the skin having the raised support surface and the base portion of two adjacent stringers has a constant thickness along the second direction,
wherein the plurality of stringers and the skin comprise a single, unitary piece of a base material, and
wherein the plurality of stringers are integrally formed with the skin by machining out of the base material.

* * * * *